Sept. 6, 1932.  R. HOFGAARD  1,876,294
CALCULATING MACHINE
Filed Jan. 25, 1924   8 Sheets-Sheet 2
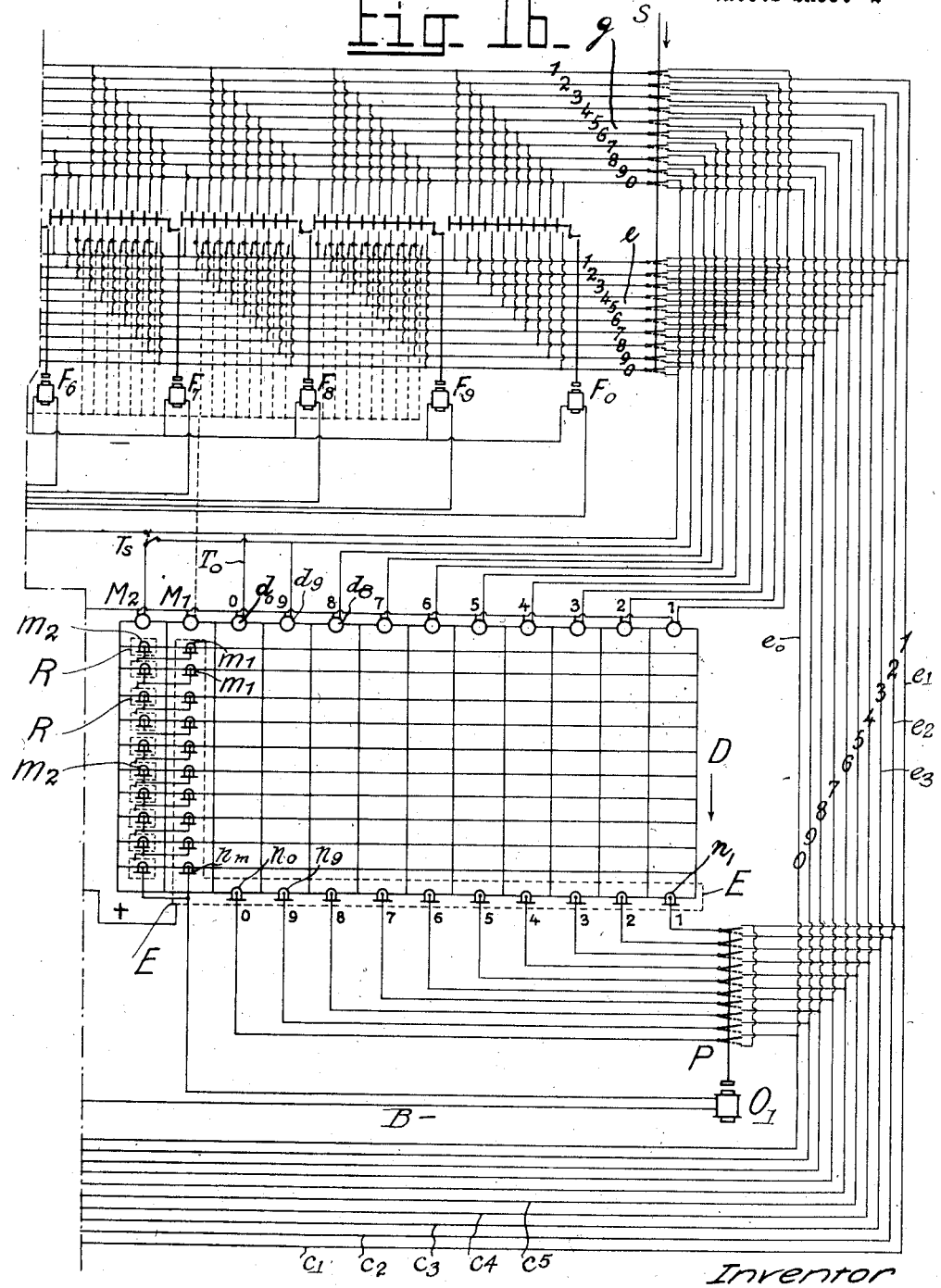
Inventor
R. Hofgaard
by Langner, Parry, Card + Langner
Atty's.

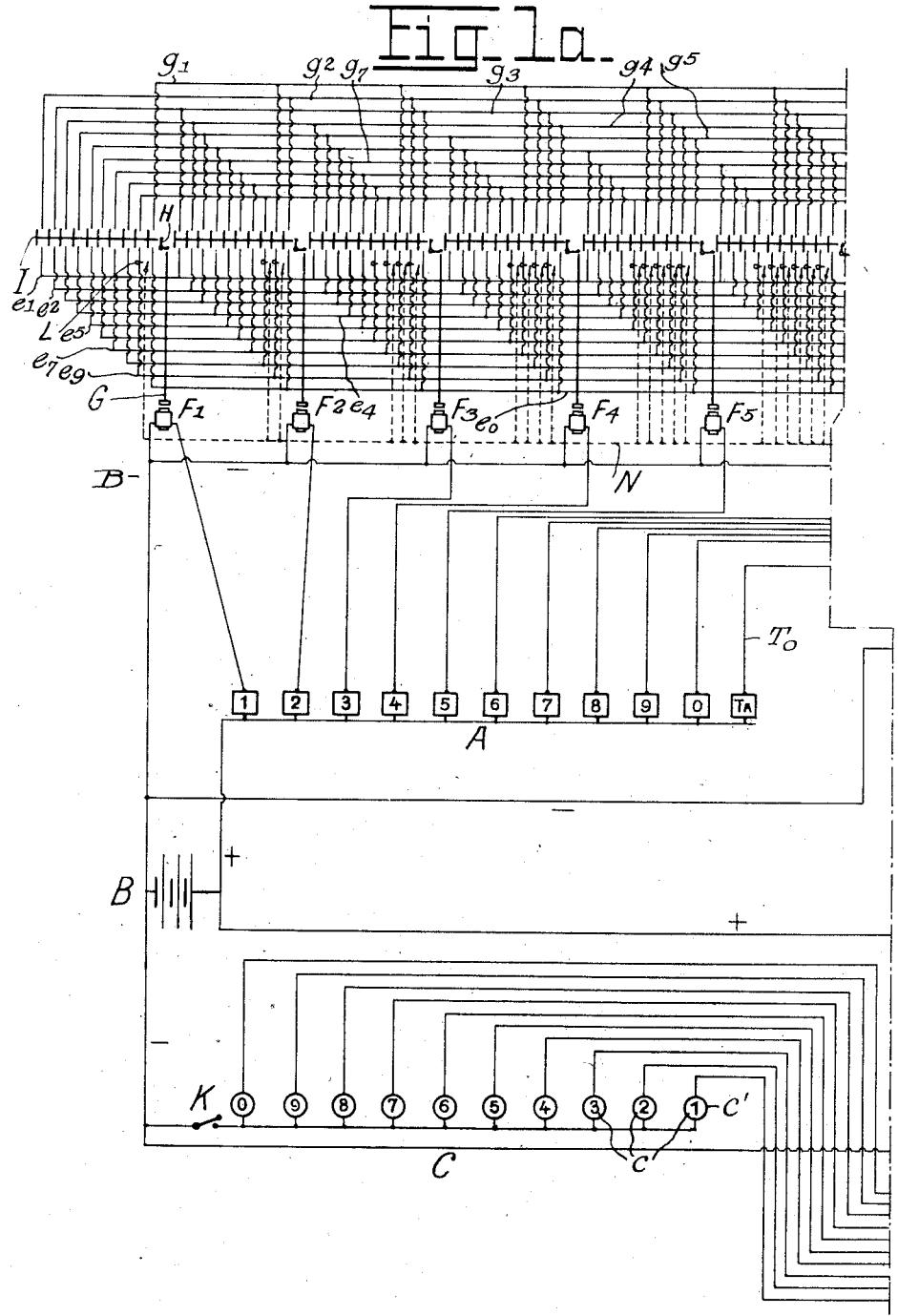

Sept. 6, 1932.  R. HOFGAARD  1,876,294
CALCULATING MACHINE
Filed Jan. 25, 1924    8 Sheets-Sheet 3
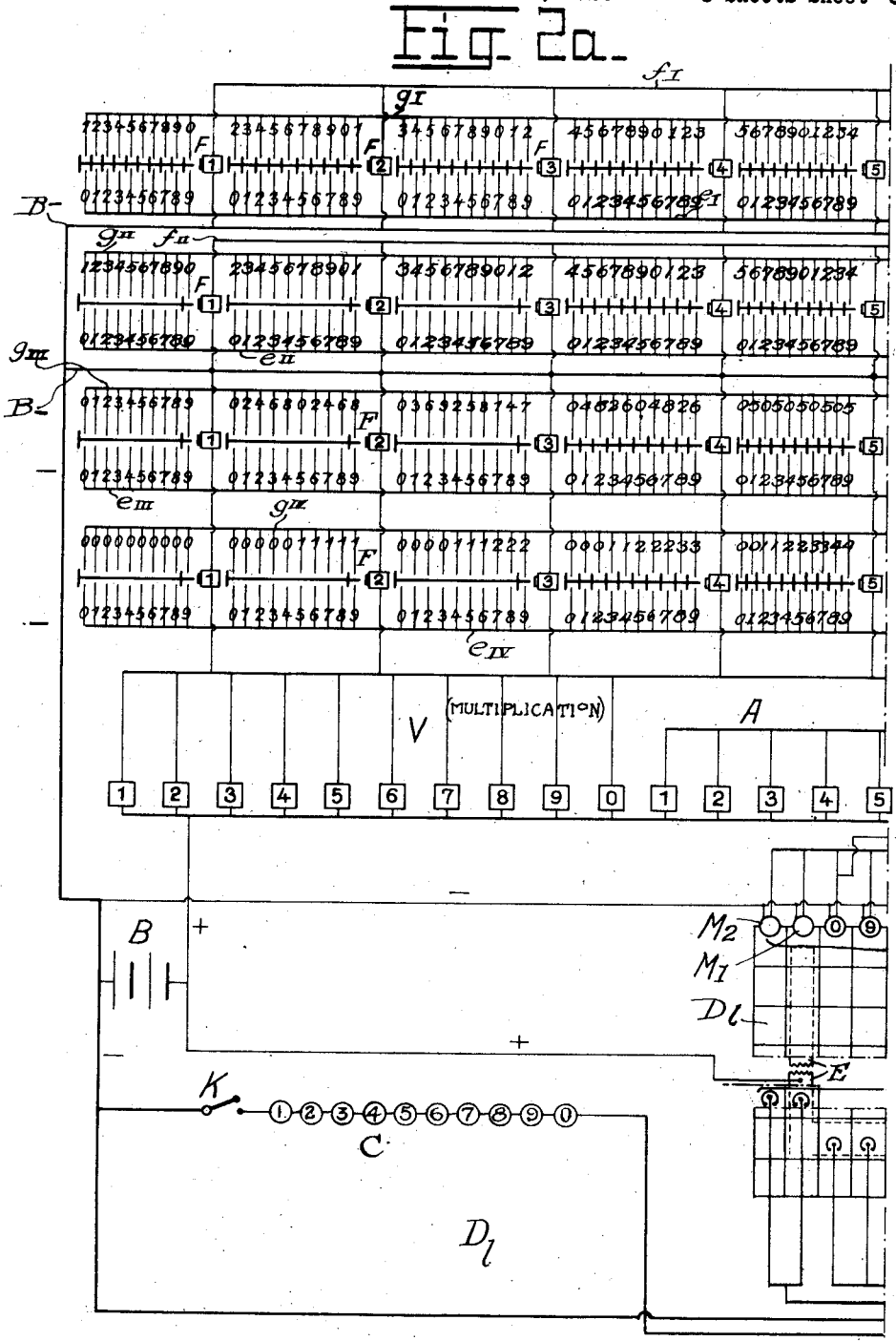
Inventor
R. Hofgaard
by Lansmer, Parry, Card + Langmer
Attys.

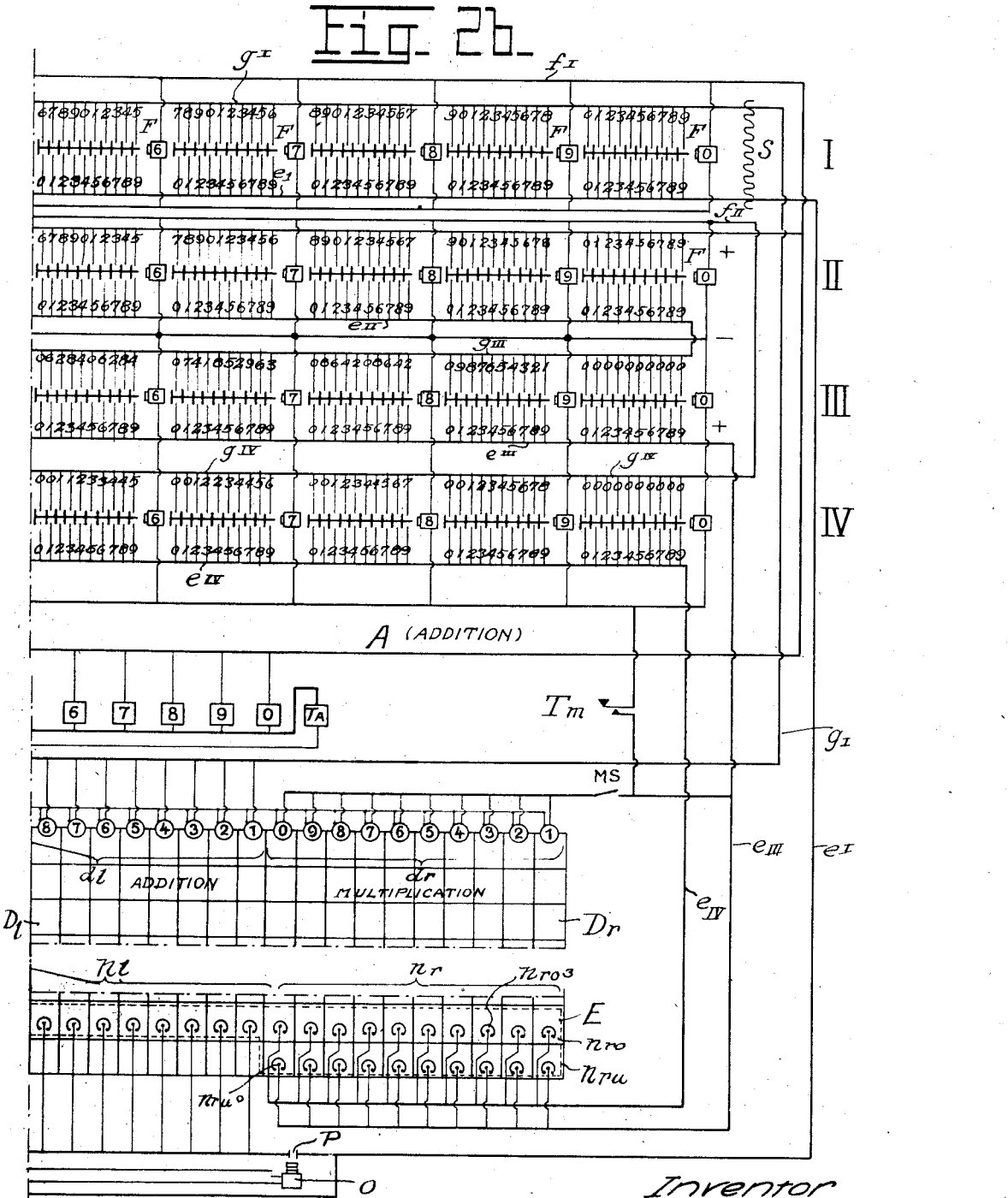

Sept. 6, 1932.  R. HOFGAARD  1,876,294
CALCULATING MACHINE
Filed Jan. 25, 1924   8 Sheets-Sheet 5

Fig. 3.

| | | 3 | 4 | 8 | 7 | . | 2 | 0 | 5 | 6 | | |
|---|---|---|---|---|---|---|---|---|---|---|---|---|
| | 0 | 6 | | | | | | | | | | |
| | | | 0 | 8 | | | | | | | | 2 |
| | | | | 1 | 6 | | | | | | | |
| | | | | | 1 | 4 | | | | | | |
| | 0 | 6 | 9 | 7 | 4 | | | | | | | |
| | | 6 | 9 | 7 | 4 | 0 | | | | | | |
| | | | | 1 | 5 | | | | | | | |
| | | | | | 2 | 0 | | | | | | 5 |
| | | | | | 4 | 0 | | | | | | |
| | | | | | | 3 | 5 | | | | | |
| | 0 | 7 | 1 | 4 | 8 | 3 | 5 | | | | | |
| | | | | 1 | 8 | | | | | | | |
| | | | | | 2 | 4 | | | | | | 6 |
| | | | | | | 4 | 8 | | | | | |
| | | | | | | | 4 | 2 | | | | |
| | 0 | 7 | 1 | 6 | 9 | 2 | 7 | 2 | | | | |

Inventor
R. Hofgaard
by Langner, Parry, Card & Langner
Att'ys.

Sept. 6, 1932.    R. HOFGAARD    1,876,294
CALCULATING MACHINE
Filed Jan. 25, 1924    8 Sheets-Sheet 7

INVENTOR
Rolf Hofgaard
BY
Ward, Crosby & Neal
ATTORNEYS

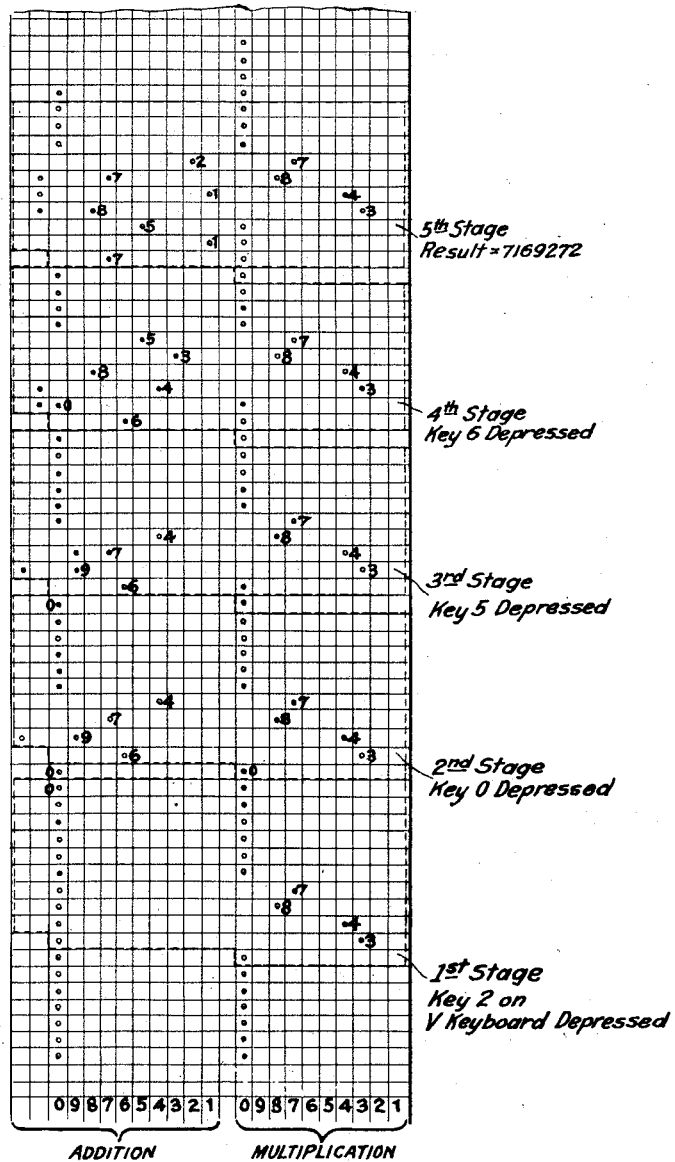

Patented Sept. 6, 1932

1,876,294

UNITED STATES PATENT OFFICE

ROLF HOFGAARD, OF LJAN, NEAR OSLO, NORWAY, ASSIGNOR, BY MESNE ASSIGNMENTS, TO HOFGAARD-REMINGTON CORPORATION, OF NEW YORK, N. Y., A CORPORATION OF DELAWARE

CALCULATING MACHINE

Application filed January 25, 1924, Serial No. 688,564, and in Norway February 6, 1923.

This invention relates to calculating machines and has for one of its objects to provide a calculating machine based upon a new principle of operation wherein the calculating operations are effected electrically and the results of said calculating operations can be continuously recorded.

Another object of the invention is to provide a machine devoid of complicated and intricate mechanical parts and one which is reliable and efficient in operation.

In accordance with the present invention I provide an electrically operated calculating machine having a number of circuit connections corresponding to a number of registering elements for connecting each key of a series of digit keys to a suitable registering element, the arrangements being such that the particular registering element thus connected, upon operation of any digit key, is controlled by the registering element actuated by a previously operated key.

In order that the invention may be more clearly understood and readily carried into effect, reference may now be had to the accompanying drawings in which are illustrated by way of example what are now considered to be preferred embodiments of and method of carrying out the invention.

In the drawings:—

Figs. 1a and 1b illustrate in detail a circuit diagram for an addition machine;

Figs. 2a and 2b illustrate a similar circuit diagram of a machine for carrying out multiplication calculations;

Figure 3 illustrates the method of procedure followed when two four figure numbers are being multiplied;

Figure 8 illustrates a developed portion of the register strip, showing the perforations as resulting from the multiplication of the numbers indicated in Figure 3.

An example of an electrically operated adding machine according to this invention will first be described with reference to Fig 4.

Figure 4:
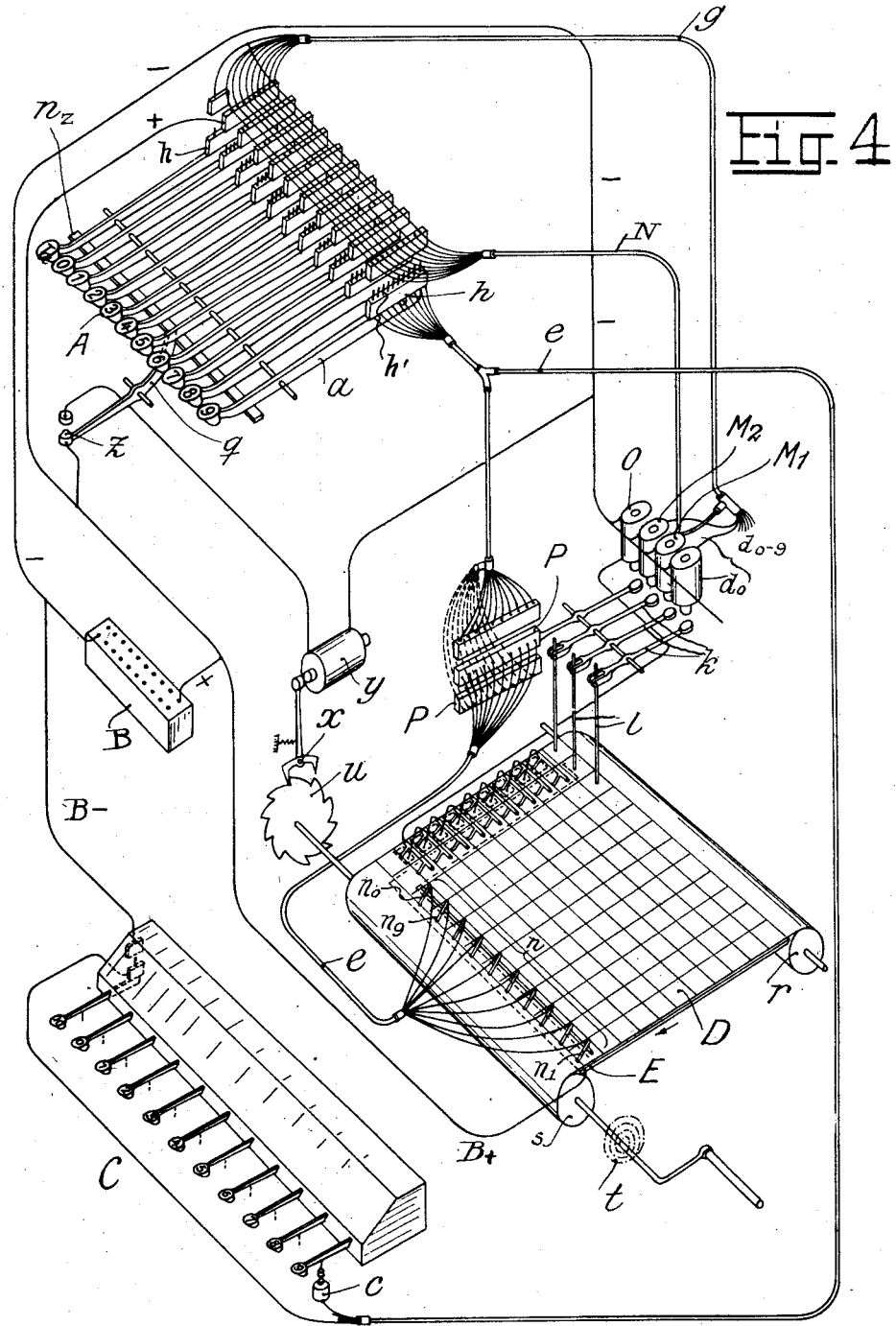
Figure 4 is a diagrammatic illustration of the skeleton of a complete machine for performing the adding operation only, showing merely the relative arrangement of the essential parts of the mechanism with certain electric parts shown as mechanical elements for sake of simplicity.

In Fig. 4, A indicates the key board of the machine, which is provided with 10 keys representing the digits 1—2—3—4—5—6—7—8—9—0 and an extra key Ta. B is an electric battery. C is a typewriting apparatus or a digit indicating device for recording or indicating the result of a calculating operation and also includes keys representing the digits 1—2—3—4—5—6—7—8—9—0. This apparatus, for example, may be a simple typewriter for recording the separate digits 0—9 and its keys may be automatically actuated by the calculating machine by means of electromagnets or the like, but may also be operated by hand for recording digits which have nothing to do with the calculating operation. D is a registering strip which in this case comprises a paper strip, which moves, in the direction indicated by the arrow one step for each digit key depressed. The length of movement for each step is indicated by parallel horizontal lines.

The strip cooperates with a series of registering elements $d$, arranged side by side, one for each of the digits 1—2—3—4—5—6—7—8—9—0 as well as two extra registering elements $M_1$, $M_2$ for registering tens.

As will be seen from Fig. 4 the registering elements each comprise an electromagnet which acts on a double armed lever $k$ the other end of which carries a rod $l$ adapted to perforate the paper strip D.

The paper strip D runs on the rollers $r$, $s$ the latter being driven by a spring motor or the like $t$. The roller $s$ carries at its other end a ratchet wheel $u$ which cooperates with the double armed oscillatory escapement $x$ which is actuated by the electromagnet $y$ the circuit through which is completed each time one of the keys A is depressed. Energization of $y$ as shown in the skeleton arrangement Fig. 4, is effected by means of the pivoted double armed lever $q$ one end of which carries a contact $z$, while the other end is provided with a cross rod $nz$ which is located directly under the keys A.

The register further includes a series of contact members $n$, which may be in the form of springs, resting on the paper strip and making contact with a conducting support E, arranged underneath the strip, when a perforation presents itself and permits such contact. The conducting support E is connected to one lead of the battery B. The keys A, in the construction illustrated in Fig. 4, are seated on the ends of double armed levers $a$, whose other ends are provided with sets of contact pins $h'$ on contact bars $h$.

By means of these sets of contact pins the ten leads of the conductor cable $e$, by depressing a digit key can be connected to the ten leads of the conductor cable $g$, in different combinations depending on the key that is depressed.

In the circuit diagram Figs. 1a and 1b, the circuit and parts for moving the paper strip D have been omitted in order to simplify the diagram. For the same reason the actual connection closed to battery B under each key of key board A are only indicated.

The ten parallel conductors forming the cables $e$ and $g$ are hereinafter referred to as digit lines. As shown in Figs. 1a and 1b, in actual practice, they are "fanned out" on each side of the multiple contact rods I respectively in certain arrangements, the digit lines $e$ always in the same order for each key but the digit lines $g_0$—9 of cable $g$ in a different order depending on the particular key with which associated. In this diagram the magnets of the register elements $d$ are merely shown diagrammatically as circles, while the contacts $n$ are also only diagrammatically indicated.

As illustrated in Figs. 1a and 1b the keys A indirectly actuate the multiple contact rods I and each key when depressed closes the circuit of one of a series of electromagnets $F_0$—9 one of which is provided for each of the digits 9—0. The various electromagnets F are connected to one lead of the battery and are connected separately to the other lead by depressing the corresponding digit key.

Each electromagnet has an armature G as is indicated in connection with the electromagnet for key 1, and this armature is connected by a bell crank lever H to the multiple contact rod I.

The digit lines $g$ are connected to the various registering elements $d$, while the digit lines $e$ are connected to the corresponding contact members $n$. Upon operation of the digit key 1, the two sets of ten conductors each as shown in the diagram Figs. 1a and 1b, are so connected that the contact lead $e_0$ is connected to the register lead $g_1$, the contact lead $e_9$ to the register lead $g_0$, the contact lead $e_8$ to the register lead $g_9$, and so on, i. e. in such a manner that each of the contact leads is connected to the register lead for a digit which is 1 greater than the digit represented by the particular contact lead.

Upon operation of digit key 2, connection is formed between the leads of the digit line in such a manner that each of the contact leads $e$ is connected to a register lead $g$ representing a digit which is 2 greater than the digit of the contact lead and so on in agreement with the circuit diagram as indicated in Figs. 1a and 1b.

To illustrate how these multiple contact rods operate in conjunction with the contact closures produced by the operation of the register elements, I will first describe the addition of two single digit numbers. Assume, for example, that it is desired to add the digits 3 and 4.

In order to obtain a perforation representing the digit 4 in the paper strip D it is first necessary to set up the digit 0 as the circuits for any perforating registering element $d$ can only be closed by any of the keys A and the multiple contact rod I, when a contact member $n$ is already in contact with the supporting plate E. Therefore before a perforation representing the digit 4 can be obtained it is necessary to effect a perforation by means of the registering element $d_0$ and this perforation must then be brought under the corresponding contact member $n_0$. To produce a perforation for the digit 0 the key $T_a$ is used. By operation of this key $T_a$ the perforating registering member $d_0$ is connected by the lead $T_0$ to the positive lead of the battery B and as the perforating member is permanently connected to the negative lead of the battery B the operation of the key $T_a$ causes actuation of member $d_0$, and a consequent perforation in the 0 column of strip D.

It is necessary for the perforation made in this manner to be brought under the contact member $n_0$ and with this object in view the band D is moved forwards in the direction of the arrow. In the simplest manner this can be effected by repeatedly closing the contact Z (Fig. 4) by tapping the $Ta$ so that the ratchet wheel device $x$ is moved by the magnet $y$ and the roller $s$ is rotated step by step by means of the spring motor $t$.

The machine diagrammatically laid out in Figs. 1a and 1b is intended for addition of numbers having eleven digits so the contacts $n$ are spaced eleven steps from the registering elements $d$. Therefore eleven successive taps of key $T_a$ are necessary to step the strip D with the first $d_0$ perforation under the contact $n_0$. Each tap of key $T_a$ also results in a perforation in the 0 column in the strip D.

When the band has been moved forwards to such an extent that the $d_0$ perforation is underneath the contact member $n_0$ the positive lead of the battery B is connected through the supporting plate E, through the perforation, and the contact member $n_0$ to the contact lead $e_0$. This will cause line $e_0$ to be activated and following the digit line $e_0$ it will be noted each extreme right hand lead running up to each multiple contact I, will be activated.

If now the key on the keyboard A which represents the digit 4 is operated the multiple contact rod I controlled by the magnet $F^4$ is operated and consequently contact lead $e_0$, which connects with the contact member $n_0$, is connected to the registering element lead $g_4$ whereby the registering element $d_4$ is supplied with current, as the various registering elements $d$, as will be seen in the diagram Figs. 1a and 1b, are permanently connected to the negative lead of the battery B. The registering member $d_4$ therefore perforates the paper strip in column 4.

The strip is thereupon again moved forwards by the repeated operation of the $T_a$ (Fig. 4) to such an extent that the perforation made by the registering element $d_4$ comes under the contact member $n_4$ whereby the contact lead $e_4$ is connected to the positive lead of the battery B and the digit line $e_4$ activated. Thereupon the key of the keyboard A, representing the digit 3, is operated and consequently the various digit lines $e$ are connected to the registering element digit lines $g$ by the multiple contact I, controlled by the electromagnet $F^3$.

As will be seen from the diagram, contact lead $e_4$ is thus connected to registering element line $g_7$, the registering element $d_7$ is activated and consequently perforates the strip D. In this manner the total of the digits 3 and 4, which were to be added, is obtained on the strip D.

If it is now desired to permanently record this total the apparatus C, above referred to, may be used for this purpose, it being constructed in the manner of a typewriter the keys of which are moved by electro-magnets $c$. The magnets $c$ are separately connected to the negative lead of the battery B by means of the switch K. On the other hand, as illustrated, the magnet $c'$ for the digit 1 is connected to the contact member lead $e_1$ by means of a lead $c_1$. In the same manner the magnet $c$ for the digit 2 is connected to the contact member lead $e_2$ by means of the lead $c_2$ and so on. If therefore the switch K is closed, the magnets for the digits 1, 2 etc., of the device C receive current as soon as the corresponding contact members $n_1$ $n_2$ etc., are connected with the supporting plate E through the perforations in the strip D, since the supporting plate E is permanently connected to the positive lead of the battery B. In order to print the previously obtained total by means of the typing device C it is only necessary to bring the perforation for the digit 7 under the contact member $n_7$. This is effected by the repeated movement of the strip D as hereinbefore described. The magnets $c$, as indicated in Fig. 4 can actuate the keys of a device similar to a typewriter or, if desired they may be used for the purpose of indicating the number in a different way, as, for example, by means of illuminated figures, figured plates, and so forth.

If now two multi-digit numbers are to be added it is first necessary to set up the first number, by suitable perforations, in the strip D. It is first necessary by means of the key $T_a$ to set as many noughts as the larger number has digits so that for each digit of the number a perforation will come under the contact $n_0$.

If for example the largest number has four digits then four nought perforations are formed in the strip D and the strip is then moved forward in the manner above described until the first nought perforation is underneath the contact $n_0$. Then a perforation corresponding to the first digit of the multi-digit number, starting from the digit in the highest decimal position, is made in the strip by pressing on the corresponding digit key in the keyboard A.

When this operation has been completed, the strip is moved forward so many steps that the perforation representing the digit first introduced, comes under the corresponding contact member $n$, and thereupon another digit, commencing from the highest decimal position, is introduced, taking care, by introducing noughts, if necessary, in front of the digit, that the digits come in the correct place in relation to those of the first digit. The machine then effects the addition in the same manner as above described, first for the highest decimal position of this number and then the lower decimal places of the number up to the units digit, and the total is registered by suitable perforations in the strip.

If, for example, the numbers 1324 and 8573 are to be added four noughts are first set up by means of the tabulator key $T_a$. Thereupon the digits of the first number are perforated in the sequence 1—3—2—4, then the strip is moved until the perforation representing the digit 1 comes under the corresponding contact member $n_1$, and then the digits of the second number are set up in the sequence 8—5—7—3, whereby 8 is added to 1, 5 to 3, 2 to 7, and 4 to 3 in the manner indicated above, the total 9897 being recorded by suitable perforations on the strip. The paper strip can be moved without perforating zeros by pressing the cross rod $nz$ directly instead of by means of the $T_s$ or digit keys.

Figure 5:
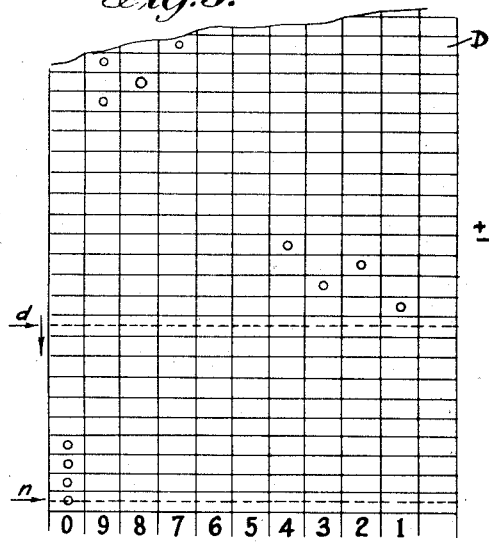
Figure 5 illustrates a portion of the register strip used, for the purpose of explaining the operation of the machine when setting the digits for addition.

In Fig. 5 a development of the strip D on which the perforations for the above mentioned calculating operation are carried out, is illustrated. The arrow on the left side of the strip D gives the direction of movement thereof. First come the four perforations in the 0 row. Then comes an interval of six steps, on the assumption that the interval between the registering members $d$ and the contact members $n$ amounts to 10 steps. Then come the perforations for the digits 1, 3, 2 and 4 and then again unused steps.

The adding operation begins when the perforation in the row 1 has come under the contact member $n_1$. Then actuation of the digit key 8 produces the perforation 9; actuation of the digit key 5, the perforation 8; and so on. The dotted cross lines indicated by $n$, and $d$ indicate the relative position of the registering members $d$ and the contact members $n$.

If further numbers are to be added to the previous ones the strip is again moved in such a manner that the first perforation of the previous result 9897 comes under its corresponding contact member and thereupon the third number is set up in the machine in the same manner as above with the result that the complete total is registered by corresponding perforations in the strip.

The final total may be permanently recorded by connecting the apparatus C in circuit in the manner above described.

For the addition of two digits whose total is greater than 9, a transfer or carrying over operation is often necessary as in other calculating machines, and the construction and operation of a suitable transfer mechanism will now be described.

In each group of connections, between the contact leads $e$ and the registering member leads $g$, which are controlled by the electromagnets $F^1$, $F^2$ etc., an electromagnet indicated in Fig. 1 at L is connected in circuit with those connecting leads representing digits which when added to other digits have a total greater than 9.

Figure 6:
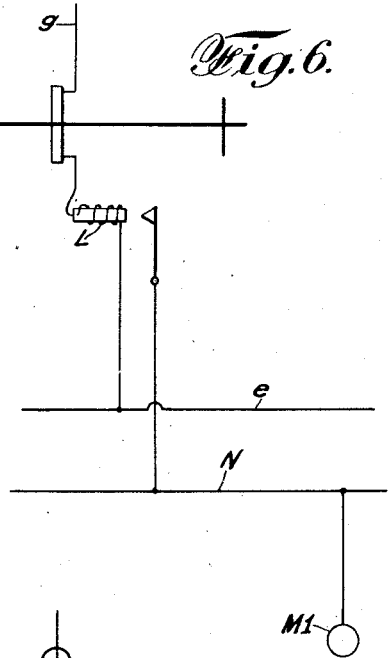
Figure 6 is a detailed showing of the connections of one of the transfer magnets.

As shown in detail in Fig. 6 the winding of each of the electromagnets is connected to its core and is also connected to the lines of $e$ and by means of multiple contact I to $g$. Each armature is connected in parallel to a lead N which is common to the various electromagnets L and which is connected to the tens registering element $M_1$.

When the line to which any magnet L is connected, is connected in circuit, by movement of the rod I to the right, the magnet attracts its armature, whereby a circuit is established through lead N to registering element $M_1$, which is permanently connected to the negative lead of the battery B similarly to the registering elements $d$.

The magnets L are only connected to those leads appertaining to each key, which are connected to digit lines $e$ representing digits which when added to the digit represented by a key depressed, give a total greater than 9.

If two digits, whose total is greater than 9 are to be added the effect will be that the magnet L connected to the digit line of the number first set up will attract its armature and thus connect the registering element $M_1$ with the current conducting lead for one of the two digits, whereby the registering element $M_1$ is brought into operation and perforates the strip D.

The contact $n_m$ which cooperates with the perforations made by the registering element $M_1$, is arranged relative to strip D, just one step in advance of the other contact members $n_1$ $n_2$ $n_3$—and this contact is thus closed simultaneously with the contact $n$ for that digit which was registered immediately before the digit effecting operation of the registering element $M_1$.

The closing of the ten transfer contact member $n_m$ connects in circuit an electromagnet $O_1$ (Figs. 1a and 1b) whose armature serves to move a switch P for each of the ten contact leads $e_1$ $e_2$ $e_3$. When the electromagnet $O_1$ is energized the switch P is simultaneously moved in such a manner that the contact member $n_1$ is connected to the contact lead $e_2$. The contact member $n_2$ is connected to the contact lead $e_3$ and so on, and the contact member $n_0$ is connected to the lead $e_1$. In other words, as the registering element of the tens transfer comes into operation, a digit, which in the total is a decimal place above the two digits whose total is greater than 9, is registered.

If for example the numbers 17 and 18 are to be added, the digit 1 and then the digit 7 is set up in the strip D in the manner indicated above. Then the strip is advanced so that the perforation representing the digit 1, comes under the corresponding contact member, and only then is the digit key 1, so depressed that the registering element $d_2$ makes a perforation. The strip D is then advanced until the 7 perforation comes under contact member $n_7$ and the digit key 8 is then operated with the result that registering element $d_5$ perforates the strip simultaneously with transfer registering element $M_1$. If now the strip D is advanced, for indicating the total, the perforation made by the registering element $d_2$ comes under the contact member $n_2$ at the same time as the perforation made by the transfer element $M_1$ comes under the corresponding contact member $n_m$. The digit 2 is consequently increased to 3 by means of the corresponding switch and the correct total 35 is obtained.

If a number is to be added to another number containing a number of nines in succession it is necessary to provide an arrangement whereby the transfer switch P comes into action at a decimal place which is a number of decimal places in front of the digits which produce the tens adjustment.

If for example the digit 5 is to be added to the number 29997 the transfer switch P must not only be in action for the digit 9, which is directly in front of the digit 7, but also for the three preceding digits 299. This is effected by the cooperation of the transfer element $M_1$, and a further transfer element $M_2$ which in the adding machine is connected permanently to the line of the registering member $d_9$, and is brought into operation each time the registering element $d_9$ is actuated.

Figure 7:
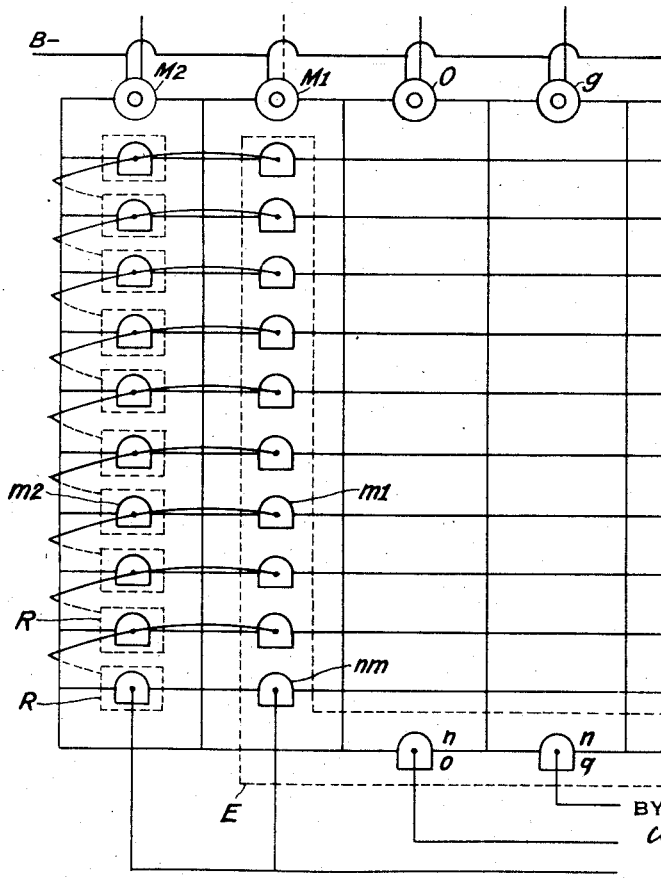
Figure 7 is an enlarged view showing the transfer contact connections at the register device.

A series of contact members $m_1$ shown in detail Fig. 7 also coact with the transfer element $M_1$, in such a manner that for each step, through which the strip moves, a contact member is provided. All these contact members $m_1$ are arranged over the same conducting support E which is connected to the positive lead of the battery B.

A series of contact members $m_2$ coact with the transfer element $M_2$ and each is conductively connected to the adjacent contact member $m_1$. The contact members $m_2$ in the series under transfer element $M_2$ cooperate with contact plates R arranged under the strip and insulated from each other. Each of these insulated contact plates R is connected with the adjacent contact member $m_1$ which is positioned one step in advance relative to the strip D, in the manner indicated in Fig. 7. The last contact member $m_2$ in the series is conductively connected to the lowermost contact member $m_1$.

If now the addition of the numbers 29997 and 5, above referred to, is to be effected, the procedure is as follows:—

The tabulator key $T_a$ is depressed as many times as there are digits in the first number which is to be set up, in other words, five times. Thereby the registering member $d_0$ produces a row of five nought perforations. Then the strip D is advanced until the first nought perforation comes under the nought contact member $n_0$. Thereupon the digit key 2 is depressed, whereby the registering element $d_2$ is connected in circuit as hereinbefore described and makes a perforation. Then the digit key 9 is depressed whereby a perforation is made by the registering element $d_9$ and simultaneously by the transfer element $M_2$. This is repeated twice and finally the digit key 7 is depressed whereby the registering member $d_7$ makes a corresponding perforation. The number 29997 is now perforated on the strip and simultaneously adjacent each nine perforation a perforation has been made by the transfer element $M_2$. The first perforation corresponding to digit 2 is now brought under the contact $n_2$ by the movement of the strip D and the digit key 0 is depressed as the digit 5, which is to be added to the number previously set up does not contain higher digits than units. The first four digits of the total consequently remain unchanged for the time being as 2999. The seven perforation is now under its contact $n_7$ and the digit key 5 is depressed with the result that the recording member $d_2$ makes a perforation simultaneously with that of the transfer element $M_1$.

In order to indicate the result obtained by this addition the strip D is thereupon further advanced until the first perforation i. e. that made by the registering element $d_2$ comes under its contact member. At the same time connection is made between the supporting plate E and that one of the supporting plates R, in the series $M_2$, which is one step in advance of the perforation which has been made by the transfer element $M_1$. As in the meantime the previous digit is a 9, a perforation is also made in this case by the transfer element $M_2$ and the same applies to the three preceding digits. The connection is closed in this manner up to the contact $m_2$ which is switched into the lead of the transfer magnet $O_1$ (Figs. 1a and 1b) and this is actuated so that instead of the digit 2 the digit 3 is registered as the first digit.

In connection with the next digit perforation which comes under its contact member, the transfer device acts in exactly the same manner and the three nines are thus changed to noughts and there is obtained the correct total 30002.

In order to subtract with the machine two reversing operations must be made, namely, (1) that by means of the reverser S (Figs 1a and 1b) a reversing of the uppermost set of ten leads from the registering elements to the contact elements and at the same time of the lowermost set of leads from the contact elements to the registering elements, as shown in dotted lines, and (2) the registering transfer element $M_2$ must be brought from the 9 lead and connected into the 0 lead, as indicated by the dotted lines at the reverser $T_s$.

After these operations, which of course, are readily performed through proper mechanism, the machine operates to subtract, the last number set up from the first one, instead of adding it thereto. The transfer of the decimals to the figures in front of the several units takes place in the same manner as in addition, with the exception that the decimal element $M_2$, on subtraction, is connected in with the registering element of the 0 and, hence, always makes a perforation at the same time as a registering element $d_0$ makes one.

For the remainder, a more detailed description of the operation is unnecessary for subtraction, as this is identical with that for addition.

On the basis of the same principle as that on which this adding machine is based, it is possible to construct a machine which will operate for multiplication processes and a circuit diagram of such a machine is shown in Figs. 2a and 2b.

Whereas in the adding machine according to Figs. 1a and 1b a set of twenty leads is used, of which the lower ten e can be connected to the upper ten g by means of ten different parallel connections of multiple contact rods I, four such sets will be required in a machine which is required to effect multiplication and division operations wherein the first two, I and II effect the addition of the partial products and the other two, III and IV (Figs. 2a and 2b) effect the formation of the partial product by multiplication.

In order not to make the figure unnecessarily complicated each cable of ten leads is indicated in this figure by a heavy line whereas the separate leads are indicated by lighter lines.

Each of the sets I—II—III—IV will hereinafter be referred to as a stage, and stage I in Figs. 2a and 2b is identical with the addition stage in Figs. 1a and 1b and serves the same purpose when the machine is used for addition purposes.

In order to explain the use of the remaining stages reference may be had to Fig. 8 in which a multiplication of two multi-digit numbers is illustrated.

This multiplication is carried out in the known manner in such a way that each of the digits of the multiplicand is first multiplied by the first digit of the multiplier whereupon the four products thus obtained are added together.

As the product of two single digit numbers can never have more than two places it will be noted that the total of these single products can be obtained in all cases by means of a series of simple additions.

Thereupon the various digits of the multiplicand are multiplied by the next digit of the multiplier and the series of one or two digit numbers which are thus obtained are added to the above mentioned total. Hereby are obtained a larger or smaller number of double additions (for example 7+5+2) for carrying out which there is used in addition to the first mentioned addition stage I, a further addition stage II which is arranged in exactly the same manner as the addition stage I.

To the total obtained by these additions there is again added the series of single or double digit products obtained by multiplying the multiplicand with the next digit of the multiplier, and so on.

As will be seen the necessity never arises in the case of two multi-digit numbers to make more than two simultaneous additions as it is only necessary to add the tens of a two digit product to the units of another two digit product and the total of these digits to one of the digits of a previously calculated product.

The single product of two single digit numbers is formed by means of the two multiplication stages III, IV. The circuit arrangement in the multiplication stage III is so arranged that if for example the digit 5 has been set up in the register as multiplicand and brought under the corresponding contact member by moving the strip, the depression of the multiplying key 7 connects in circuit a registering element which corresponds with the units in the product 5×7=35, i. e. the registering element 5.

The multiplication stage IV is so arranged that when depressing a multiplication key, for example 7, the registering element of that particular digit is switched in which corresponds with the tens in the product between the digit perforated on the strip (therefore in this numerical example 5×7=35 the number 5) and the digit corresponding with the key, therefore in this case the registering element for the digit 3. In this manner the two multiplication stages III and IV are used for effecting the multiplication.

The action of the keys on the various circuits of the stages I—II—III—IV is exactly the same as that explained in connection with the description of Figs. 1a and 1b, but in the machine in Figs. 2a and 2b two sets of ten digit keys are provided of which the left hand set V serves to influence the two multiplication stages III and IV whereas the right hand set A serves to influence the stage I.

The strip with the corresponding perforators and contact members is the same in principle as that described in connection with Figs. 1a and 1b but differs from Figs. 1a and 1b in that two sets of registering elements and contacts are provided, the right hand set $d_r$ and $n_r$ respectively of which co-operates with the multiplication stages III, IV, and the left hand set $d_l$ and $n_l$ with the addition stage I.

The right hand part of the recording band serving to control the multiplication stages III, IV is provided with two rows of contact members $n_r$, arranged one behind the other, making two for each digit. The first of these contact members $n_{ro}$ controls the multiplication stage IV, which calculates the tens in a two digit single product, and the other $n_{ru}$ controls the multiplication stage III which calculates the units in a two digit single product.

In Figs. 2a and 2b as was explained in connection with Figs. 1a and 1b, various parts, as those opening the strip and contacts directly closed by the keys have been omitted, as have the transfer magnets L in the adding stage and the magnets of the registering elements and the contacts they control, are again only indicated diagrammatically, all in the interests of simplicity and clearness.

It is to be noted that the lower row of contacts $n_{ru}$ are directly connected when perforations reach them, back to respective registering elements of the same side of the device so that the perforations made on this part of the strip are automatically repeated with an interval of eleven steps in case the interval between the registering elements and the contact elements on the addition register comprises ten steps.

The operation of the calculating machine illustrated diagrammatically in Figs. 2a and 2b will best be understood from the follow description of the multiplication of the numbers 3487 and 2056, the result on strip D can be seen in Fig. 8 for each stage of the calculation.

The multiplicand 3487 is first set up in the multiplication part of strip D indicated $D_r$. First enter zero perforations in multiplication register and then the digits of 3487 so as to get in all eleven perforations in multiplication register 00000003487. This is done by closing key $T_m$ and tapping the respective keys of the multiplication key board V. At the same time key $T_a$ of keyboard A is tapped so as to get a continuous volume of nought perforations in the addition part of register $D_1$ of strip D. This last operation, of course, may take place automatically by any convenient means, the strip moving forward one step for each perforation.

Now opening key $T_m$ and tapping key $T_a$ of keyboard A until perforation corresponding to digit 3 is under its contact $n_{ro}^3$. There is now a nought perforation at $n_{ru}^0$ and the machine is ready for the multiplying operation.

Now depressing key 2 of keyboard V and maintaining it in depressed condition, a current is closed from battery through 2 line to contact magnets $F_2$ in stages III and IV and back to battery and contact magnets $F_2$ operate their multiple contact rods so as to close the multiple contacts which they control. As there is a nought perforation under contact $n_{ru}^0$ and a perforation under contact $n_{ro}^3$ a current is closed from battery through contact plate E zero line of trunk $e_{III}$ through multiple contact O at stage III operated by $F_2$ to zero line of trunk $g_{III}$ and zero line in trunk $e_{II}$.

Another circuit is closed from contact E over $n_{ro}^3$ through the 3 line of trunk $e_{IV}$ through multiple contact 2 of stage IV operated by $F_2$ to zero line of trunk $g_{IV}$ and to magnet $F_0$ in stage II. As the zero line in trunk $e_{II}$ is under current, the circuit is closed through the multiple contact controlled by magnet $F_0$ in stage II to zero line in trunk $g_{II}$ and through magnet $F_0$ in stage I and back to battery thus energizing magnet $F_0$ in stage I. Now as a nought perforation is under the nought contact in addition register $D_1$ a circuit is closed from contact plate E through the zero line of trunk $e_I$ and from there through the zero line of multiple contact controlled by magnet $F_0$ in stage I over zero line in trunk $g_I$ and from there through the nought registering elements in addition register $D_1$ back to battery causing said registering elements to make a perforation.

When this perforation has been made the strip is advanced one step bringing the 3 perforation in multiplication register $D_r$ under its contact $n_{ru}^3$ and the 4 perforation under its contact $n_{ro}^4$. A circuit is now closed through the 3 line of trunk $e_{III}$ and the 4 line of $e_{IV}$. The 3 line current will pass through multiple contact 3 in stage III operated by $F_2$ to the 6 line of trunk $g_{III}$ then to the 6 line of trunk $e_{II}$. The current in 4 line of $e_{IV}$ will pass through multiple contact in stage IV operated by $F_2$ to the zero line $g_{IV}$ and through magnet $F_0$ in stage II back to battery energizing said magnet so that multiple contact zero in stage II is again closed. The current in line 6 of trunk $e_{II}$ will pass through this multiple contact onto the 6 line of trunk $f_I$ and through magnet $F_6$ in stage I back to battery, energizing said magnet so as to close the multiple contacts controlled thereby. As there is a nought perforation under its contact in the addition register $d_1$ a current will pass from battery through the zero line of trunk $e_I$ over multiple contact 6 in stage I at $F_0$ to the 6 line of trunk $g_I$ and from then through registering element 6 in the addition register (left side of strip) back to battery, energizing said registering element so as to cause a 6 perforation, whereupon the ribbon is again advanced one step as before.

Now the 4 perforation in multiplication register is under its contact $n_{ru}^4$ and the 8 perforation under its contact $n_{ro}^8$. Current may, therefore, pass through the 4 line of $e_{III}$ through multiple contact of $F_2$ in stage III to line 8 in trunk $g_{III}$ and line 8 in trunk $e_{II}$. Current may also pass through the 8 line of $e_{IV}$ through multiple contact of $F_2$ in stage IV to the 1 line in $g_{IV}$ and further on to the 1 line in trunk $f_{II}$ through multiple contact operating magnet $f_I$ in stage II and back to battery energizing said magnet so as to close the multiple contacts controlled thereby. The current in line 8 of $e_{II}$ will pass through the said multiple contact to the 9 line of $g_{II}$ and then 9 line of $f_I$ energizing the contact magnet $f_9$ in stage I and back to battery. As there is still a nought under the nought contact in the addition register $d_1$ current will pass through the zero line of $e_1$ through multiple contact controlled by magnet $f_9$ in stage I to the 9 line in trunk $g_I$ through registering element 9 in addition register (left side of strip) and back to battery energizing said registering element so that a 9 perforation is made whereupon the strip is again advanced one step as before.

This brings the 8 perforation in the multiplication register under its contact $n_{ru}^8$ and the 7 perforation under its contact $n_{ro}^7$. The currents in the 8 and 7 lines $e_{III}$ and $e_{IV}$ respectively will pass in the same manner as above described through the closed multiple contacts of $F_2$ in stages III and IV to the 6 line in trunk $e_{II}$ and the 1 line in trunk $f_1$, and as another current energizes magnet $f_1$ in stage II the first current will pass through multiple contact of $F_1$ in stage II to the 7 line in trunks $g_{II}$ and $f_1$ closing circuit over multiple contact 7 of $F_7$ in stage I. There being still a zero perforation under the corresponding contact in addition register, the current from battery will pass through contact plate E, zero contact of addition register, zero line in trunk $e_I$ multiple contact 7 of $F_7$ of stage I, the 7 line in trunk $g_I$ and then through registering element 7 in addition register left side of strip causing said element to form a perforation and back to battery, and the strip advance one step as before.

This further advancement of the strip has brought the perforation in column 7 under the contact $n_{ru}^7$. At the same time there is a zero perforation under its corresponding contact in the addition register. With 7 perforation under its contact in the line $n_{ru}$ there is a circuit closed from battery over E to the 7 line in trunk $e_{III}$ whereby the multiple contacts 7 in the stage III are energized. At the multiple contact bar operated by magnet $F_2$ the circuit is closed over the contact 7 to the 4 line in $g_{III}$ and consequently to the 4 contacts in the stage II across the respective contact there to the 4 line in $f_1$ energizing the magnet $F_4$ in stage I the 4 line in —$g_{III}$— being active as the zero perforation under —$n_{ro}$— has caused the —0— line in —$c_{IV}$— to be active, and thereby activated —0— line in —$g_{IV}$— and the consequent actuation of magnet —$F_0$— in stage II. There being a naught perforation as stated before in the addition register under its contact, circuit on the other side is made through the 0 line in trunk $e_I$ to the 0 contacts in stage I which in the group of multiple contacts controlled by $F_4$ will close the circuit over the line 4 in $g_I$ down through the registering element 4 to cause a perforation in that particular column, the circuit going back to the battery through the common negative lead of the registering element.

There has now been perforated on the strip on the addition side the first partial product 6974. The apparatus is now ready for the operation of the second stage of the multiplying problem involving the depression of the digit key 0 of the keyboard V. Such depression obviously will merely cause a stepping forward of the whole strip whereby the number 3487 is again set up on the multiplication side as before and also the perforations representing number 6974 will also be repeated, but this time one step in advance of the perforations with which they were parallel heretofore, see particularly Fig. 8.

Multiplication with the next digit 5 of the multiplier 2056 may now be effected by holding down the key 5 of the keyboard V, resulting in setting up on the addition side of the register the next partial product 714835. The respective perforations for this product comprise a perforation in the 6 and in the $M_1$ column equalling 7; next a perforation in the 0 column together with the perforation $M_1$ column representing 1; then a perforation in the 4 column followed by perforations in the 8, 3 and 5 columns respectively, see Fig. 8.

The strip meanwhile has again stepped forward with a repetition of the multiplicand 3487 on the multiplication side of the register so as to be ready for the next stage, namely the multiplication with the digit 6.

The multiplication with the digit 6 results in perforations in the strip on the addition side for the final result 7169272. The perforations for this result comprise first a perforation in the 7 column; then a perforation in the 1 column; then a perforation in the 5 column together with a perforation in the $M_1$ column; next perforation in the 8 column together with a perforation $M_1$; then a perforation in the 1 column together with a perforation $M_1$; and finally perforation in the 7 and 2 columns respectively. It is to be recalled as explained in the addition device that a perforation in the $M_1$ column due to the transfer mechanism gives a final figure one higher than the perforation with which it is associated. Thus the perforation in the 5 column together with the $M_1$ perforation equals 6, while $8+M_1$ equals 9, and $1+M_1$ equals 2.

The operation of the transfer mechanisms $M_1$ and $M_2$ have been set forth in detail in connection with the description of the pure addition device Figs. 1a and 1b and it is not believed necessary to repeat description of their operation again.

When finally the multiplicand has been multiplied by all the digits of the multiplier the total result is recorded by connecting the result printing device C in circuit by means of the switch K in exactly the same way as previously described in connection with the adding machine shown in Figs. 1a and 1b.

The multiplicand is cleared out of the machine at the conclusion of a problem, by breaking the feed-back circuit connection between trunk —$e_{III}$— and elements —$d_r$— by means of switch —MS— normally closed, and advancing the strip by tapping key —$T_a$— until all perforations relating to the multiplication problem just performed, are out from beneath the contacts.

In order to use the machine for division, the dividend is first set up on the side of strip D, in the usual manner, and the divisor set up on the multiplication side in the same manner as the multiplicand in multiplying. If the divisor is 02056, 0 thus comes under its second contact element, 2 under its first contact element, etc. If the dividend, for example is 7169272, care is taken that the first figure of the dividend, as 7, comes simultaneously under its contact element, and the following figures in corresponding steps.

When the dividend and divisor have simultaneously assumed their above described positions in their parts of D, the adding stage I is reversed, (carried over) to subtraction, by the reverses S and Ts, (see Figs. 1a and 1b).

When this is done, the 9 key of the multiplying keyboard V is depressed, whereby the two first figures of the divisor are multiplied by 9 and the product subtracted from the first figure of the dividend. When the said product is greater than the first figure of the dividend, the decimal contact in the register device indicates this, and it is seen that it is nine times too much, and that thus the first figure in the quotient is less than 9.

The operation is the same with 8—7—6—5 etc., until a figure is reached, at which there is no indication of the decimal magnet, when a figure greater than 0 is perforated on the strip. The product of the divisor corresponding to the depressed key is necessarily smaller than the dividend, and is automatically subtracted therefrom. The same operation is repeated in exactly the same manner with the remainder of the dividend until, in this same manner, as many figures are found in the quotient as can be used.

Instead of first depressing the 9 key, the 8 key, is used, etc., in order to find the figure of the quotient. Use may be made, of course, of an automatic finder, which depresses the keys from 9 down, and is automatically held in position when, after subtraction, there is no indication on the decimal magnet. This can be done by having the automatic finder driven step by step, each time, by a decimal magnet when the latter is actuated.

Having now particularly described and ascertained the nature of the invention and in what manner the same is to be performed, I declare that what I claim is:—

1. An electrically operated calculating machine comprising two sets of digit lines, registering elements arranged to be operated by current in corresponding lines of one set, means adapted to be conditioned by said registering elements to represent numbers, contact members controlled by said means for closing the lines in the other set, and selectively operable means for interconnecting said sets.

2. An electrically operated calculating machine comprising a plurality of registering elements, a series of digit keys, means for causing the operation of a particular registering element which is operated upon actuation of a digit key, by the closing of a contact through means operated upon by a registering element which has been operated by a previously actuated digit key.

3. A machine according to claim 1, in which the means conditioned by the registering elements comprises a movable strip adjacent the contact members, in which actuation of the registering elements makes perforations, and in which strip the contact members cooperate with the said perforations to connect the contact members to a source of potential.

4. An electrically operated calculating machine comprising a series of digit keys, a plurality of registering elements, a plurality of corresponding registering element leads, a plurality of contact members, a plurality of corresponding leads connected thereto, a movable strip adjacent the contact members, actuation of the registering elements operating to perforate the strip, the contact members cooperating with the perforations produced in the strip to permit connection of the contact member leads to a source of potential, connection means for the digit keys whereby operation of any digit key connects each contact member lead with a corresponding registering element lead, said connection means being arranged so that each contact member lead is connected with a registering element lead representing a digit higher in value than the contact lead, by the amount represented by the particular digit key operated.

5. An electrically operated calculating machine comprising a series of digit keys, a plurality of registering elements, a plurality of corresponding registering element leads, a plurality of contact members, a plurality of corresponding leads connected thereto, a movable strip adjacent the contact members, in which actuation of the registering elements operates to perforate the strip, the contact members cooperating with the perforations produced in the strip to permit connection of the contact members leads to a source of potential, connection means for the digit keys whereby operation of any digit key connects each contact member lead with a corresponding registering element lead, an electromagnet for each digit key energized upon operation of its key, an armature for each magnet, and means operable by said armature to establish the said connections between the leads of the registering elements and the leads of the contact members.

6. An electrically operated calculating machine comprising a series of digit keys, a plurality of registering elements, a plurality of corresponding registering element leads, a plurality of contact members, a plurality of corresponding leads connected thereto, a movable strip adjacent the contact members, in which actuation of the registering elements operates to perforate the strip, the contact members cooperating with perforations produced in the strip to permit connection of the contact member leads to a source of potential, connection means for the digit keys whereby operation of any digit key connects each contact lead with a corresponding registering element lead, said connection means being arranged so that each contact lead is connected with a registering element lead representing a digit higher in value than the contact lead, by the amount represented by the particular digit key operated, an electromagnet for each digit key energized upon operation of its key, an armature for each magnet, and means operable by each armature to establish the said connections between the leads of the registering elements and the leads of the contact members.

7. An electrically operated calculating machine comprising a series of digit keys, a plurality of registering elements, a plurality of corresponding registering element leads, a plurality of contact members, a plurality of corresponding leads connected thereto, a movable strip adjacent the contact members, in which actuation of the registering elements operates to perforate the strip, the contact members cooperating with the perforations produced in the strip to permit connection of the contact member leads to a source of potential, a tabulator key for actuating the 0 registering element, means for moving the strip to position to permit the corresponding 0 contact member to place its lead in connection with a source of potential, and means, upon actuation of a digit key corresponding to a number to be set up on the strip, operating to place the 0 contact member lead and the registering element corresponding to the actuated digit key, in series circuit with each other, thus actuating such registering element and perforating the strip.

8. A machine according to claim 1, having a main transfer mechanism comprising means for altering the normal order of sequence of the said other set of digit lines, and means for automatically bringing the mechanism into operation, when the calculation involves a decimal transfer.

9. A machine according to claim 2, having a plurality of corresponding regist ring element leads, a plurality of contact members, a plurality of corresponding leads connected thereto, a main transfer mechanism, and means for automatically bringing the mechanism into operation, when the calculation involves a decimal transfer, the main transfer mechanism including, electromagnets connected to the contact member leads, corresponding armatures actuated upon energization of the electromagnets and connected to a main transfer registering element, a corresponding main transfer contact member, and means whereby the transfer contact member completes a circuit with a source of potential over a lead one step in advance, of the digit contact members, whereby to automatically effect necessary decimal transfers.

10. A machine according to claim 2, in which the means operated upon by the registering elements is a strip which is perforated upon operation of the registering elements, a plurality of corresponding registering element leads, a plurality of contact members, a plurality of corresponding leads connected thereto, a main transfer mechanism, means for automatically bringing the mechanism into operation, when the calculation involves a decimal transfer, the main transfer mechanism including, electromagnets connected to the contact member leads, corresponding armatures actuated upon energization of the electromagnets and connected to a main transfer registering element, a corresponding main transfer contact member, and means whereby the transfer contact member completes a circuit with a source of potential over a lead one step in advance, of the digit contact members, whereby to automatically effect necessary decimal transfers, actuation of the main transfer registering elements perforating the strip, and a series of main transfer contact members positioned to cooperate successively with such perforation.

11. A machine according to claim 2, in which the means operated upon by the registering elements is a strip which is perforated upon operation of the registering elements, a plurality of corresponding registering element leads, a plurality of contact members, a plurality of corresponding leads connected thereto, a main transfer mechanism, means for automatically bringing the mechanism into operation, when the calculation involves a decimal transfer, the main transfer mechanism including, electromagnets connected to the contact member leads, corresponding armatures actuated upon energization of the electromagnets and connected to a main transfer registering element, a corresponding main transfer contact member, and means whereby the transfer contact member completes a circuit with a source of potential over a lead one step in advance, of the digit contact members, whereby to automatically effect necessary decimal transfers, actuation of the main transfer registering element perforating the strip, and a series of main transfer contact members positioned to cooperate successively with such perforation, a second transfer mechanism, including, insulated contact plates each connected respectively to a main transfer contact member which is one step in advance thereof, and a series of second transfer mechanism contact members coacting with the insulated plates.

12. A machine according to claim 2, in which the means operated upon by the registering elements is a strip which is perforated upon operation of the registering elements, a plurality of corresponding registering element leads, a plurality of contact members, a plurality of corresponding leads connected thereto, a main transfer mechanism, means for automatically bringing the mechanism into operation, when the calculation involves a decimal transfer, the main transfer mechanism including, electromagnets connected to the contact member leads, corresponding armatures actuated upon energization of the electromagnets and connected to a main transfer registering element, a corresponding main transfer contact member, means whereby the transfer contact completes a circuit with a source of potential over a lead one step in advance, of the digit contact members, whereby to automatically effect necessary decimal transfers, actuation of the main transfer registering element perforating the strip, a series of main transfer contact members positioned to cooperate successively with such perforation, means whereby those leads which were previously connected with the registering elements can be connected to the contact members, and vice-versa, and a device whereby the second transfer mechanism contact element can be connected to the 0 contact lead instead of to the 9 contact lead, for the purpose specified.

13. An electrically operated calculating machine, comprising the combination of a series of addition digit keys, a series of multiplication digit keys, a plurality of registering elements, two groups of leads cooperating with the addition digit keys, two groups of leads cooperating with the multiplication digit keys, the groups of leads being arranged upon operation of a digit key to actuate a registering element, the addition digit keys being so connected to certain of the registering elements that the registering element last connected with an addition digit key is controlled upon operation of such a digit key, by the closing of contacts through means operated upon by the registering element actuated by a previously operated digit key, and the multiplication digit keys being so connected to other of the registering elements, that the result given by operation of any multiplication digit key is equal to the product of the numerical values of such key and of the registering element actuated by a previously operated multiplication key.

14. A machine according to claim 1 having a series of digit keys, an electromagnet for each digit key energized upon operation of its key, armature means for each magnet, and means operable by one of said armature means to establish the said connections between the sets of lines.

15. In an electrical calculating machine the combination of means for effecting an electrical calculating operation under electrical cyclical control comprising a plurality of sets of electrical lines each set of which represents the series of digits of a numerical system and means for interconnecting lines of said sets, mechanical means for rendering said interconnecting means operative, and electrical means for operating said mechanical means.

16. In an electrical calculating machine, the combination of at least three sets of electrical lines each of equal number and means for interconnecting lines of two of said sets according to mathematical functions, a register device connected to control said interconnecting means over one of said two sets of lines, and a set of digit keys connected to said interconnecting means over the third set of lines, said register and said digit keys being adapted to furnish respective numbers whose mathematical combination is desired to said interconnecting means, and the other of said two sets of lines being adapted to receive impulses representative of said mathematical combinations.

17. In an electric calculating machine, the combination of a first set of lines, a second set of lines, a set of electrically operated units equal in number to the number of one of said sets of lines, a plurality of groups of electrical contacts for interconnecting said sets of digit lines in various combinations and controlled by said units, said contacts of each group being connecting to respectively corresponding lines of each set, a third set of lines, a register device, a digit keyboard, two of said sets of lines being connected to said register and being adapted to carry electrical impulses respectively to and from said register and said third set of lines being connected to said digit keyboard and to said electrically operated units controlling said groups of contacts.

18. In a device of the character described, two sets of digit lines each equal in number to the digits of a numerical system, means for interconnecting said sets in accordance with mathematical functions and comprising a plurality of electrical relays equal in number to the number of lines in the first of said sets and each of said relays operating a plurality of contacts equal in number to the lines of the second of said sets, and a register device comprising a plurality of electrically operated members actuated by current in respectively corresponding lines of one set and said interconnected lines of said other set for determining the subsequent closing of contacts for closing the lines of the other set.

19. In a device of the character described, two sets of digit lines each equal in number to the digits of a numerical system, means for interconnecting said sets in accordance with mathematical functions and comprising a plurality of electrical relays equal in number to the number of lines in the first of said sets and each of said relays operating a plurality of contacts equal in number to the lines of the second of said sets, a register device comprising a plurality of electrically operated members actuated by current in respectively corresponding lines of one set and said interconnected lines of said other set for determining the subsequent closing of contacts for closing the lines of the other set, and recording means operable by current impulses in the lines of said last mentioned set.

20. In an electrical calculating machine the combination with electrical calculating means, digit representing control means for entering desired digit values into said machine, and digit contacts adapted to control current impulses, of a sheet of material having predetermined physical characteristics adapted to control the current flow from a suitable source of potential through said contacts in accordance with and pursuant to said predetermined characteristics, said sheet cooperating with said digit representing means for jointly initiating and controlling the operating cycle of said machine.

21. In an electrical calculating machine the combination with electrical calculating means, digit representing control means for entering desired digit values into said machine, and digit contacts adapted to control current impulses to said calculating means, of a sheet of material having predetermined physical characteristics adapted to control the current flow from a suitable source of potential through said contacts in accordance with and pursuant to said predetermined characteristics, said sheet cooperating with said digit representing means for jointly controlling the operating cycle of said machine.

22. In an electrical calculating machine, the combination with two sets of digit lines, calculating means comprising a plurality of relay operated devices for interconnecting certain of said lines according to mathematical functions, and contacts in circuit with certain of said lines, of an element having predetermined physical characteristics representing digit values of respective denominational orders corresponding to a given numerical value, said element being adapted to control certain of said contacts according to its predetermined characteristics, and said controlled contacts serving to introduce the numerical value represented by said element into said calculating means.

23. In an electrical calculating machine, the combination with two sets of digit lines, calculating means comprising a plurality of relay operated devices for interconnecting certain of said lines according to mathematical functions, and contacts in circuit with certain of said lines, of a sheet of material having predetermined physical characteristics representing digit values of respective denominational orders corresponding to a given numerical value, said sheet being adapted to control certain of said contacts according to its predetermined characteristics, and said controlled contacts serving to introduce the numerical value represented by said sheet into said calculating means.

24. In an electrical calculating machine, the combination of a plurality of sets of digit lines, calculating means under electrical cyclical control and comprising a plurality of relay operated devices for interconnecting certain of said lines according to mathematical functions and adapted to furnish resultant electrical impulses representative of digit values of respective denominational orders, electrically controlled means corresponding to respective digit values for altering the physical characteristics of a physical medium, and means operated in accordance with and pursuant to said resultant electrical impulses for operating said last means.

25. In an electrical calculating machine, the combination of a plurality of sets of digit lines, calculating means comprising a plurality of relay operated devices for interconnecting certain of said lines according to mathematical functions and adapted to furnish resultant electrical impulses representative of digit values of respective denominational orders, a plurality of punches corresponding to respective digit values for punching holes in a piece of material, and means controlled by said resultant electrical impulses for punching holes in said piece of material in accordance with digit values of respective denominational orders.

26. In an electrically operated calculating machine, the combination of punches, register magnets for operating the punches, a line connecting one pole of each magnet to one side of an electrical source of energy, a line extending from the other pole of each magnet, a plurality of sensing elements, a line extending from each sensing element, means for moving record material under the punches and sensing elements, a conducting plate located under the sensing elements and adapted to be engaged by a sensing element when a perforation is presented under the sensing element, a line connecting said plate to one pole of a source of energy, a plurality of keys, and switches individual to said keys and operated under control thereof for connecting said sensing lines to said punch lines in various combinations to cause said punches to perforate the sum of the amounts represented by the key depressed and the perforation sensed.

27. In a calculating machine, a series of punches 1 to 0, a series of digit keys, means for operating the punches under control of said keys, and a tabulating key for causing an operation of the zero punch.

28. In a calculating machine, a series of punches 1 to 0, means for feeding record material under said punches, and a tabulating key for causing an operation of the zero punch and said feeding means.

29. In a calculating machine, a series of punches 1 to 0 for punching totals, a series of keys 1 to 0 for causing said punches to punch the sum of the amount in the machine and that represented by the keys depressed, and a key for directly causing an operation of the zero punch.

30. In an electrical calculating machine, the combination of a plurality of punches, a plurality of sensing devices, a plurality of keys, means for selecting punches jointly under control of the sensing device and the keys, a strip of paper for receiving perforations by the punches to be analyzed by the sensing device, and means for imparting a step by step movement to the strip of paper, the sensing device being located from the punches a distance in steps of movement of the paper corresponding to the highest number of denominational orders of numbers that may be computed.

31. In an electrical calculating machine, the combination of a series of electromagnetically operated punches, a series of sensing elements, keys, means under control of the keys for electrically connecting the sensing elements to the punch elements to punch the sum of the amounts sensed and represented by the keys when the sum is nine or less than nine and to punch the last digit of the sum and a transfer perforation when the sum is ten or greater, and means controlled by a transfer perforation for varying the connection from the sensing element sensing a sum less than ten for connecting a sensing element to a punch circuit representing a value one higher than the sensing element operated.

32. In an electrical calculating apparatus, the combination of punching elements to punch digits 1 to 0, sensing elements to sense perforations 1 to 0, keys for electrically connecting the sensing elements to punching elements to punch the sum of the value of the sensing element operated and the key depressed when the sum is less than ten and the lower denominational digit when the sum is greater than nine, transfer punches automatically operated when the sum is greater than nine, and preparatory transfer punches automatically operated when the sum is equal to nine.

33. In an electrical calculating apparatus, the combination of punching elements to punch numbers 1 to 0, sensing elements to sense perforations 1 to 0, keys for electrically connecting the sensing elements to punching elements to punch the sum of the value of the sensing element operated and the key depressed when the sum is less than ten and the lower denominational digit when the sum is greater than nine, transfer punches automatically operated when the sum is greater than nine, preparatory transfer punches automatically operated when the sum is equal to nine, a series of sensing elements cooperating with the transfer perforations, the first of which elements causes a change in the interconnection of circuits when an amount is sensed and punched ahead of an amount greater than nine, and a second sensing element connected in circuit and cooperating with a preparatory transfer perforation and connected with the second transfer sensing element for changing said interconnections.

34. In an electrical calculating machine, the combination of result perforation sensing elements for sensing numbers 1 to 0, sensing elements for sensing transfer perforations, and preparatory transfer sensing elements for sensing perforations when the first mentioned sensing elements sense perforation nine, said transfer and preparatory transfer elements being electrically connected to cause a transfer in the denominational order next higher than a denominational order containing a nine when the number in the denominational order next lower than the one containing nine is greater than nine.

35. In an electrical calculating machine, the combination of sensing elements for sensing the higher denominational perforations of denominational partial results, transfer sensing elements for sensing transfer perforations in lower denominational partial results, preparatory transfer sensing elements for sensing preparatory perforations in lower denominational partial results, and circuits connecting all of said preparatory transfer sensing elements to the first transfer sensing element and individually to each transfer sensing element in the next higher denominational order.

36. In an electrical calculating machine, a series of electrical circuits 1 to 0 adapted to be energized in accordance with the amount in the machine, a transfer circuit adapted to be energized when the next lower denominational number in the amount involved a transfer, and means for energizing said transfer circuit when the next lower denominational number in the amount is nine and the number in the denominational number of the amount immediately next lower to the one containing nine involved a transfer.

37. In an electrical calculating machine, the combination of a row of sensing elements 1 to 0, means for moving a perforated strip step by step to present successive denominational perforations to said sensing means, a row of transfer sensing elements arranged in the direction of movement of the strip and cooperating with transfer perforations, a row of preparatory transfer sensing elements arranged parallel to said row of transfer elements, means under control of one of said transfer sensing means for modifying the result produced by the row of sensing elements 1 to 0, and means for operating said last mentioned means under control of one or more preparatory transfer sensing elements and a preceding transfer sensing element.

38. In an electrical calculating machine, the combination of a series of keys for indexing amounts to be entered, a switch controlled by each key, a series of electro-magnetically operated punches connected to one pole of a source of energy, lines extending from said punches to one side of said switches in the same arrangement, a series of sensing elements adapted when operated to connect with the other pole of the source of energy, lines extending from said sensing elements to the other side of the switches and arranged in different arrangement to effect computation, the switches being adapted to connect the two series of lines upon depression of a corresponding key, a transfer punch circuit adapted to be energized when the sum is greater than nine, a preparatory transfer punch circuit energized when the sum is equal to nine, and means for adapting the machine to perform subtraction comprising a means for switching the circuit to cause operation of the preparatory punch when the zero punch is operated and a means for reversing the lines from the sensing elements and punches with respect to the switches.

39. In an electrical multiplying machine, the combination of a registering mechanism, keys for entering the multiplicand in the registering mechanism and for subsequently indexing the multiplier, a system of lines activated by said registering mechanism in accordance with one denominational digit of the multiplicand, another system of lines activated by said registering mechanism in accordance with the next lower denominational digit of the multiplicand, means operated by said keys when setting up a digit of the multiplier for connecting said systems to two other systems respectively to activate one system of lines according to the units of the product by the higher order denominational digit of the multiplicand and the other system according to the tens of the product by the next lower digit of the multiplicand, means controlled by the last two systems for activating lines representing the sum of said units and tens, and means for entering said sum on said registering mechanism.

40. In an electrical calculating machine, the combination of a keyboard, a punching mechanism, a sensing mechanism, means operated by the keys for controlling the punches to perforate the multiplicand, and electrical means under conjoint control of the sensing mechanism and the keys when used for indexing a multiplier, for controlling the punches to punch the product.

41. In an electrical calculating machine capable of performing the process of multiplication, a strip of record material, a series of multiplicand punches, a keyboard for controlling said punches to perforate the multiplicand in denominational position in the strip, a series of sensing devices, means for moving the strip under the sensing devices, means for entering the multiplier by depression of said keys, means for operating said punches to punch the multiplicand as the multiplicand is sensed, a series of product punches, and electrical means under control of said sensing means and said keys for computing the product and operating said product punches.

42. In an electrical calculating machine capable of performing the process of multiplication, a strip of record material, a series of multiplicand punches, a keyboard for controlling said punches to perforate the multiplicand in denominational position in the strip, a series of sensing devices, means for moving the strip under the sensing devices, means for entering the multiplier by depression of said keys, means for operating said punches to punch the multiplicand as the multiplicand is sensed, a series of product punches, electrical means under control of said sensing means and said keys for computing the product and operating said product punches, and a second series of sensing devices for sensing said product perforations when the multiplier involves more than one digit and for controlling in conjunction with said keys and said first sensing devices the selection and operation of the product punches to perforate the product obtained by a multiplier of more than one digit.

43. In a calculating machine, a record strip, a keyboard, a series of punches for perforating a portion of said strip to indicate a multiplicand, means for sensing said multiplicand, a second series of punches cooperating with another portion of said strip, and means controlled by said sensing means and keys when entering a multiplier to control said second series of punches to perforate the product.

44. In a calculating machine, a strip of record material, a keyboard, a series of punches for perforating indications of the multiplicand in said strip, a series of sensing devices for sensing the perforations of the multiplicand, a series of product punches, a series of product sensing devices, and electrical connections under control of said multiplicand sensing devices, said product sensing devices and said keys for controlling said product punches to perforate the product of the multiplicand by a multiplier of two or more digits.

45. In a calculating machine, the combination of an adding keyboard and a multiplying keyboard for setting up the multiplicand and multiplier, a series of punches for each keyboard, means for feeding a strip of record material under said punches, a series of sensing devices for each set of punches, the punches and corresponding sensing devices cooperating with the multiplying keyboard, being employed to perforate and sense the multiplicand, adding and multiplying mechanisms, means controlled by the multiplicand sensing devices for controlling the multiplicand punches to reperforate the number sensed, means controlled by the adding sensing devices and the adding keyboard for controlling the adding punches to punch the sum, and means controlled by both series of sensing devices and the multiplying keys for controlling the adding punches to punch the product.

46. In a machine of the class described, the combination of a series of multiplicand punches, a series of product punches, the two series being arranged in one line, a series of product sensing devices, two series of multiplicand sensing devices one of which latter two series is in line with the series of product sensing devices and the other of which is arranged one step ahead of said one series of multiplicand sensing devices, means for controlling said multiplicand punches to perforate the multiplicand and for subsequently entering the multiplier and in conjunction with all of the sensing devices computing the product and perforating the partial product by the product punches, and means controlled by the second series of multiplicand sensing devices for perforating the multiplicand one step behind the partial product for multiplying operation by the second digit of the multiplier.

47. In an electrical calculating apparatus, the combination of a keyboard, a series of punches, a series of sensing devices, means under control of the keyboard and sensing devices for computing the sum of the amount in the machine and the amount indexed on the keyboard and for controlling the punches to punch said sum, a second series of keys, punches and sensing devices, means for controlling the punches from the keys, means under control of said second series of keys and sensing devices for computing the product of two numbers and in conjunction with the first series of sensing devices for controlling the first series of punches to punch the sum of said sum and said product, means under control of the second sensing devices for directly controlling the second series of punches to punch the amount sensed, and means for throwing out said last mentioned means when the final product is punched to print the product to be added to another number entered by the first keyboard of the machine.

In testimony that I claim the foregoing as my invention, I have signed my name.

ROLF HOFGAARD.